United States Patent
Draginich et al.

(10) Patent No.: US 6,560,329 B1
(45) Date of Patent: May 6, 2003

(54) AUTOMATED CALL ROUTING SYSTEM

(75) Inventors: Lawrence J. Draginich, Boxford, MA (US); Jeffrey A. Fried, Cambridge, MA (US); Richard G. Plummer, Arlington, MA (US); Peter N. Vicars, Newton, MA (US)

(73) Assignee: Teloquent Communications Corporation, Billerica, MA (US)

( * ) Notice: Subject to any disclaimer, the term of this patent is extended or adjusted under 35 U.S.C. 154(b) by 0 days.

(21) Appl. No.: 09/303,766

(22) Filed: Apr. 29, 1999

(51) Int. Cl.[7] .......................... H04M 3/42; H04M 1/56; H04M 7/00
(52) U.S. Cl. .......................... 379/265.02; 379/207.02; 379/142.01; 379/219; 379/210.01
(58) Field of Search .................. 379/207, 210.01, 379/142.01, 219, 265.02

(56) References Cited

U.S. PATENT DOCUMENTS

| | | | |
|---|---|---|---|
| 4,259,549 A | 3/1981 | Stehman | 179/18 ES |
| 4,796,294 A | 1/1989 | Nakagawara | 379/258 |
| 4,866,758 A | 9/1989 | Heinzelmann | 379/94 |
| 4,996,685 A | 2/1991 | Farese et al. | 370/58.1 |
| 5,007,080 A | 4/1991 | MacMillan et al. | 379/269 |
| 5,036,535 A | * 7/1991 | Gechter et al. | 379/210.01 |
| 5,097,528 A | 3/1992 | Gursahaney et al. | 379/67 |
| 5,168,515 A | 12/1992 | Gechter et al. | 379/265 |
| 5,187,787 A | 2/1993 | Skeen et al. | 395/600 |
| 5,235,595 A | 8/1993 | O'Dowd | 370/94.1 |
| 5,291,492 A | 3/1994 | Andrews et al. | 370/110.1 |
| 5,333,133 A | 7/1994 | Andrews et al. | 370/58.2 |
| 5,414,762 A | 5/1995 | Flisik et al. | 379/198 |
| 5,675,637 A | * 10/1997 | Szlam et al. | 379/142.01 |
| 5,848,143 A | * 12/1998 | Andrews et al. | 379/219 |

OTHER PUBLICATIONS

Press Release, Feb. 2, 1998 Teloquent Announces Contact Server™—Turning PBX'Into Virtual Call Centers.
Contact Server Products Requirements, Version 1.6, May 29, 1998.

* cited by examiner

Primary Examiner—Ahmed F. Matar
Assistant Examiner—Thjuan P Knowlin
(74) Attorney, Agent, or Firm—Fish & Richardson P.C.

(57) ABSTRACT

An automatic call distribution system routes calls from a communications network that provides call arrival data and a controllable routing capability. The system includes several agent stations, a call server, and a routing controller. Each agent station has a processor and a communication element to receive calls routed thereto. The call server uses telephony lines to receive the call arrival data and to direct the routing capability of the network. The call server has a caller prompting unit to request and receive information from a caller. The call server generates call information from the information from the caller and/or the call arrival data. The routing controller receives agent status data from the agent stations and the call information and selects an agent station from the call information and the agent status data. The routing controller causes the call server to direct the network to route the call to the selected agent station.

25 Claims, 9 Drawing Sheets

AUTOMATED CALL ROUTING SYSTEM

BACKGROUND OF THE INVENTION

This invention relates to an automated call distribution system that routes calls between a network and agent stations.

In many automated call distribution systems, a private branch exchange (PBX) routes incoming customer telephone calls to individual agent stations. The PBX connects an agent station to a telephone line in response to receiving a incoming client call on the line. The PBX is operated by a control device that insures that the PBX routes each incoming call to an available and suitable agent.

Many PBX's have a data or computer telephony integration (CTI) interface. The CTI interface provides call arrival data, agent line status data, and signal protocols for controlling the PBX. Thus, the CTI is an all-in-one interface for both monitoring calls and agents' lines and for controlling the PBX. For this reason, many current control devices connect to the CTI interface.

The CTI interfaces use specific data protocols, which vary widely with the manufacturer and model of the PBX. The protocols of popular CTI interfaces include message protocols, such as ASAI and CSTA, and function protocols, such as MITAI, TSAPI, TAPI, CT-Connect, and Callpath. To support the popular makes of PBX, a manufacturer of control devices, which couple to the CTI interface, would have to produce many different devices adapted to the many popular protocols.

The protocols for CTI interfaces are relatively new and likely to change with time. Thus, a manufacturer of control devices, which couple to the CTI interface, may also be forced to modify his control devices if he wants buyers of future PBX's to continue to use them.

SUMMARY OF THE INVENTION

In one aspect, the invention provides an automated call distribution system for calls over a communications network. The network provides call arrival data and a controllable routing capability. The automatic call distribution system includes a plurality of agent stations, a call server, and a routing controller. Each agent station has a processor and a communication element connected to receive calls routed thereto. The call server uses telephony lines to receive the call arrival data from and to direct the routing capability of the network. The call server has a caller prompting unit to request and receive information from a caller. The call server generates call information in response to the information from the caller and/or the call arrival data. The routing controller receives data for agent status from the agent stations and the call information from the call server and selects an agent station based upon the call information and the agent status data. The routing controller causes the call server to direct the routing capability to route the call to the selected agent station.

In some embodiments, the routing controller is configured to route both incoming and outgoing calls with respect to the automated call distribution system. The call arrival data for incoming calls may include ANI, CLID, DNI, DNIS, and/or II.

In various embodiments, the agent stations are configured to receive calls having the form of electronic mail messages, audio-video calls, facsimiles, or telephone calls. Some agent stations may be fully automated machines capable of providing an interactive session with a caller.

Some embodiments are adapted for use with a PSTN that has a Centrex or other private network (e.g., a PBX) connected to the PSTN. In these embodiments, the call server operates the routing capability of the Centrex or other private network with signals sent over the telephony lines.

In another aspect, the invention provides an automated call distribution system for calls over a telephone network that provides call arrival data. The network may be a PSTN, a wireless network, or an internet network. The automated call distribution system includes either a PBX or key system and also includes a plurality of agent stations, a call server, and a routing controller. The PBX or key system connects to the network to receive calls and to generate associated call arrival data. Each station has a processor and a communication element for receiving calls routed thereto by the PBX or key system. The call server uses telephony lines to receive the call arrival data from and to direct call routing by the PBX or key system. The call arrival data may include ANI, CLID, DNI, DNIS, and/or II. The call server has a caller prompting unit to request and receive information from a caller. The call server generates call information in response to the information from the caller and/or the call arrival data. The routing controller receives data for agent status from the agent stations and the call information from the call server. A data network may carry the agent status data from the agent stations to the routing controller. The controller selects an agent based upon the call information and the agent status data and causes the call server to direct the PBX or key system to route the call to the selected agent station.

In some embodiments, a second routing controller receives agent status data and call arrival data from the agent stations and the call servers, respectively. The second routing controller operationally replaces the first routing controller in response to a failure in the first routing controller.

In some embodiments, the call server includes a program storage device encoding an executable program to perform speech recognition or to send facsimiles.

Some embodiments include a second PBX or key system, a plurality of second agents, and a second call server. The second PBX or key system receives calls and associated call arrival data from the network. The second agent stations have processors and communication elements and receive calls routed thereto by the second PBX or key system. The second call server connects to the second PBX or key system through telephony lines to receive the call arrival data from and to direct call routing by the second PBX or key system. The second call server has a caller prompting unit to request and receive information from a caller. The call server generates call information in response to the information from the caller and/or the call arrival data. The routing controller connects to the second agent stations to receive second agent status data and connects to the second call server to receive call arrival data therefrom. The routing controller selects one of the second agent stations based upon the call information and the second agent status data and causes the second call server to direct the second PBX or key system to route the second call to the selected second agent station.

The first and second PBX's or key systems may interact with the respective first and second call servers by different telephony protocols.

In some embodiments, the network includes a PSTN having a Centrex connected to the PSTN. The automated call distribution system also includes second agent stations with processors and communication elements to receive calls routed by the Centrex and a second call server. The second call server uses one or more telephony lines to receive the call arrival data from and to direct call routing by the Centrex. The routing controller receives agent status data and call arrival data from the second agent stations and the second call server, respectively. The routing controller selects a second agent station from the call arrival data and agent status data and causes the second call server to operate the Centrex to route a call to the selected second agent station.

First and second data lines may connect the routing controller to the call server and the agent stations, respectively. The second data lines transmit agent status data to the routing controller.

Agent stations may connect to the network with one of an ISDN interface, an internet interface, a wireless interface, and a POTS interface. Some agent stations may be fully automated machines capable of interacting with a caller.

Other objects, features, and advantages of the invention will be apparent from the following description taken together with the drawings and claims.

DESCRIPTION OF THE PREFERRED EMBODIMENTS

U.S. Pat. Nos. 5,168,515 and 5,333,133 are incorporated by reference herein, in their entireties.

Figure 1:
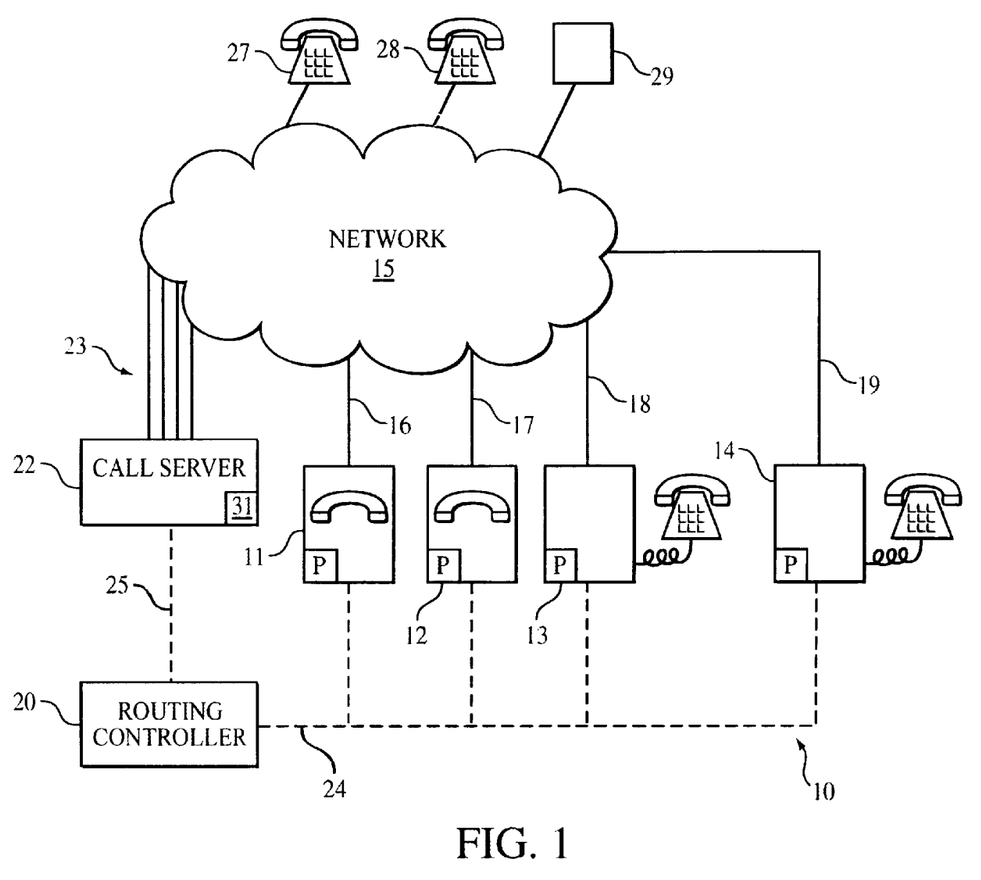
FIG. 1 illustrates an embodiment of an automated call distribution system connected to a network.

FIG. 1 illustrates an automated call distribution system 10 connected to network 15. The call distribution system 10 includes several agent stations 11–14. Each agent station 11–14 has an interactive communication unit, e.g., a telephone voice unit, that couples to network 15 via a telephony line 16–19. Each agent station 11–14 also includes a processor, P, that operates a data interface. The data interface couples to a routing controller 20 via a data link 24. The routing controller 20 also couples to a call server 22 via a data link 25. The data links 24, 25 may be part of an ethernet or another local or wide area network. The call server 22 has a telephony interface, which couples to the network 15 via one or more telephony lines 23.

The network 15 may be a public switched telephone network (PSTN), a PSTN with a PBX, a PSTN with a Centrex, a wireless network, an internet network or a combination of networks. Thus agent stations 16–19 may be located anywhere on a public telephone network or other private network connected to it so long as there is a call routing (e.g., transfer) capability to an agent connected at that network, as is discussed below. The network 15 transmits signals of a telephony standard, such as analog loop start, digital PBX, TI/E1, PRI, Q.931, SIP, H.323, or BRI.

The network 15 provides intrinsic call arrival data for calls incoming to the call distribution system 10. The call arrival data may include automatic number identity (ANI), caller line identity (CLID), dialed number identity (DNI), dialed number information service (DNIS), and/or incoming information (II) for the type of the calling client device, e.g., wireless, cellular, pay phone, etc.

The network 15 also provides a capability to route each call to a selected one of the agent stations 11–14. The routing capability is externally controllable through the telephony lines 23 connecting to the call server 22. E.g., the routing capability could be provided by a call transfer function.

Telephony lines 23 provide the call server 22 with call arrival data on each incoming call from a client device 27–29, i.e. incoming with respect to the call distribution system 10. In various embodiments, the calls may be telephone calls, audio-video calls, facsimiles, or electronic mail messages. The call server 22 transfers the call arrival data, associated with each incoming call, to the routing controller 20 via the data link 25.

The call server 22 also has a caller prompting unit 31 for prompting the caller at the waiting device 27–29 for further call data. The caller prompting unit 31 generates signals appropriate to the type of call received by the call distribution system 10. For example, the caller prompting unit 31 is a voice response unit if the calls are telephone calls, an electronic message generating and analyzing unit if the calls are electronic messages, and a facsimile device if the calls are facsimiles. The call server 22 also transmits call data obtained by prompting the caller to the routing controller 20 via the data link 25.

The routing controller 20 also receives updates of the agent status via end-to-end data messages sent from the agent stations 11–14 via the link 24. The agent status can include a variety of agent states, and typically would include: idle, ready, ringing, active, wrap up, and hold as is described in U.S. Pat. No. 5,168,515. Agent stations send agent status messages to the routing controller 20 automatically for some state changes and in response to orders by the local agents for other changes as described in U.S. Pat. No. 5,168,515.

The routing controller 20 analyzes call data and agent status data to select one of the agent stations 11–14 to process the associated call. To be selected an agent needs to be in the ready state and at least as suitable as other ready agents. The routing controller 20 directs the call server 22 to route the call to the selected agent station 11–14. The call server 22 uses telephony signals (e.g., a transfer function) to operate the network's routing capability so that the call is routed to the selected agent station 11–14.

The forms of the agent stations 11–14 depend on the form of the network 15 and the form of the calls. For example, if the network 15 is an IP network and the calls are electronic mail messages or message sessions, the agent stations 11–14 may be computers with IP telephony interfaces and electronic mail servers. If the network 15 is a wireless network, the agent stations 11–14 may be cellular telephones with built in computers or computers with cellular modems. Either device may operate according to the code division multiple access (CDMA) standard or the groupe speciale mobile (GSM) standard. If the network 15 is a PSTN with a PBX or a PSTN with a Centrex and the calls are audio calls, the agent stations 11–14 may be external telephones under computer control or telephones built into a computer with an ISDN card and circuit switched voice hardware.

Figure 2:
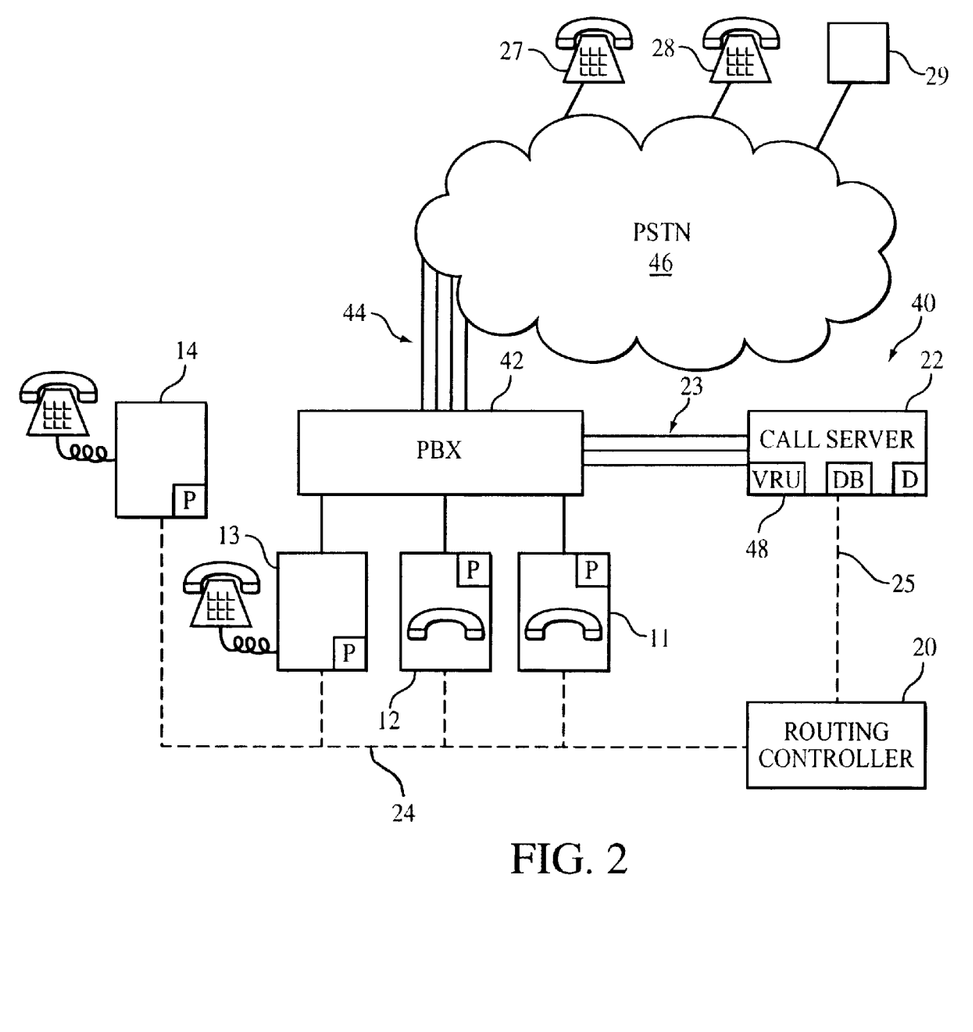
FIG. 2 illustrates an embodiment of an automated call distribution system, which employs a PBX.

FIG. 2 illustrates a specific embodiment 40 of the automated call distribution system 10 of FIG. 1. The automated call distribution system 40 uses a PBX 42 that couples a plurality of trunk lines 44 from a PSTN 46 to the call distribution system 40. The PBX 42 sends the above-described call arrival data to the call server 22 and provides a call routing capability responsive to telephony signals received from the call server 22 via the telephony lines 23, e.g., POTS lines. The PBX 42 can route waiting calls from the client devices 27–29 to selected agent stations 11–14. The PBX can also route calls to agent stations (not shown) connected to PSTN 46 outside of PBX 42.

Figure 3A:
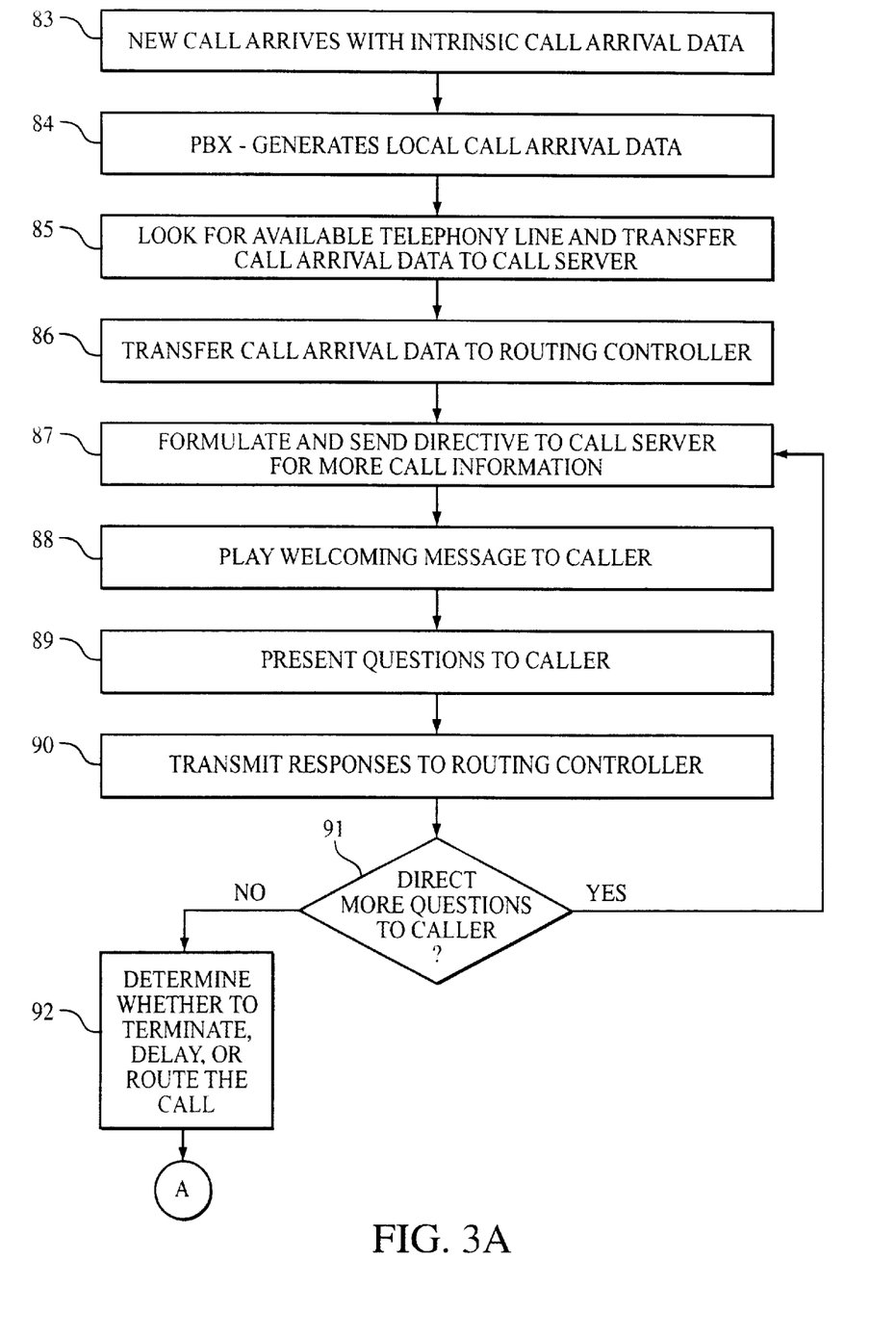
FIGS. 3A and 3B provide a flow chart illustrating a method by which the automated call distribution system of FIG. 2 routes an incoming call.
Figure 3B:
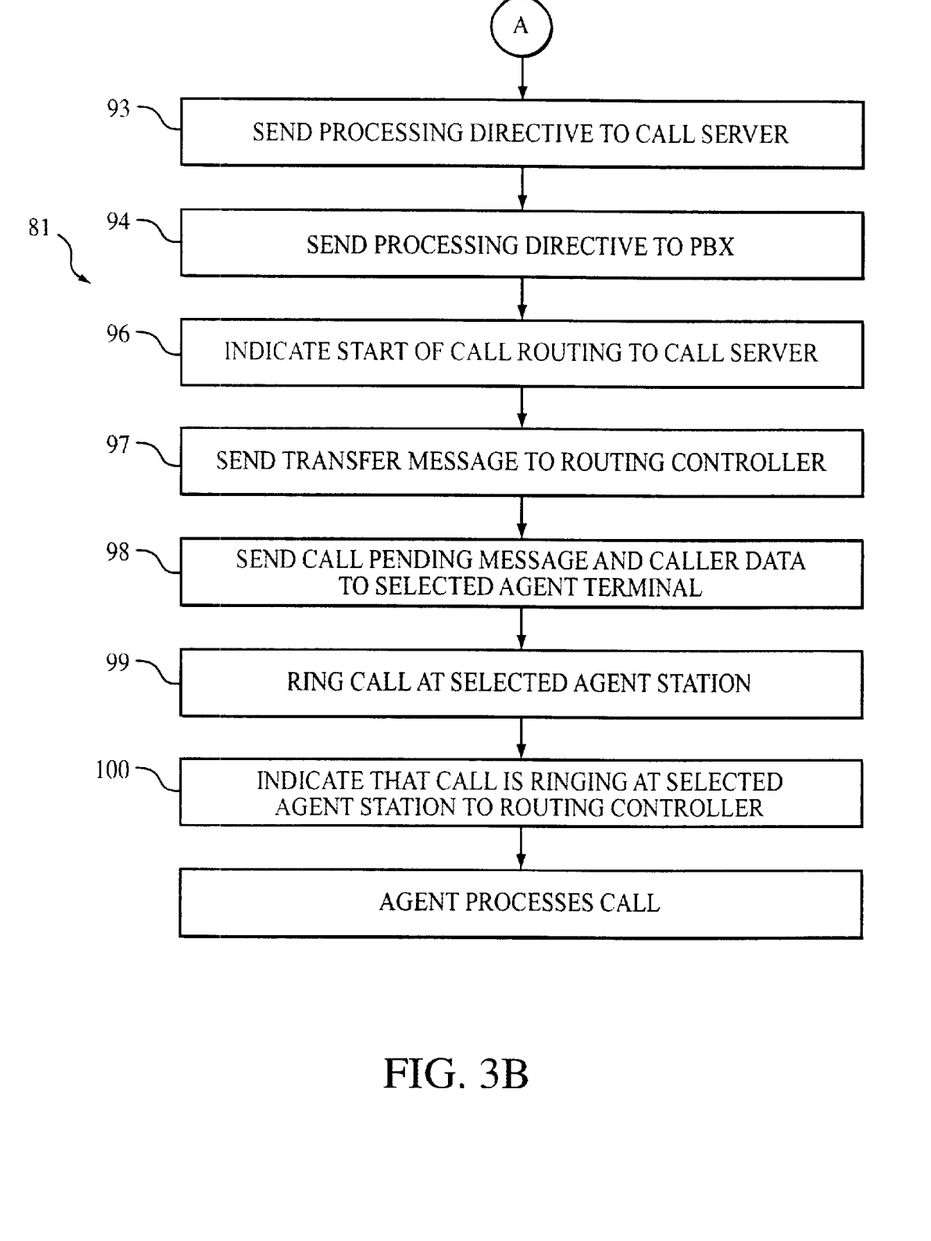
Figure 4:
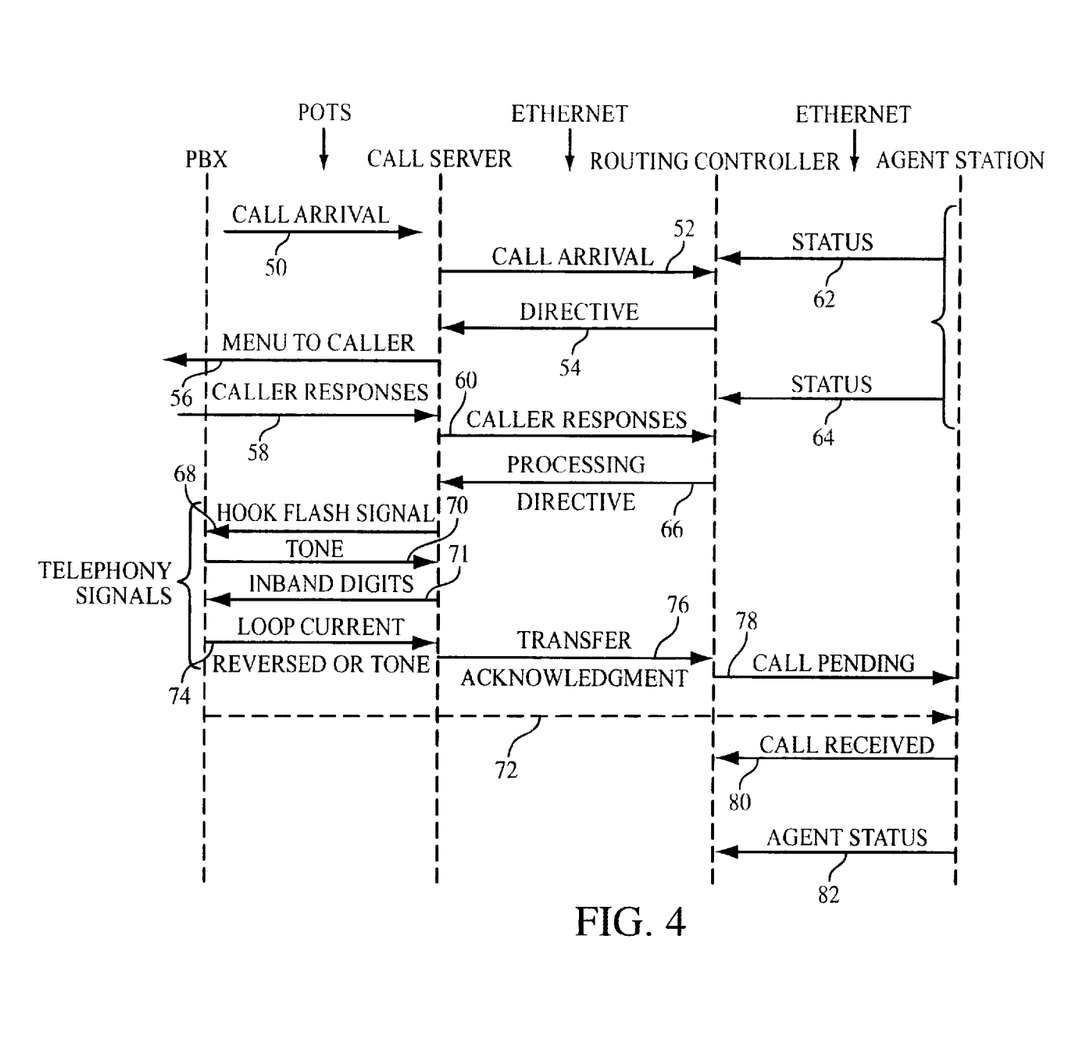
FIG. 4 illustrates the message transmissions used to route a call with the method shown in FIGS. 3A and 3B.

FIGS. 3A–3B provide a flow chart for a method 81 of routing an incoming client call with the automated call distribution system 40 of FIG. 2. In the method 81, the PBX 42 and call server 22 transmit signals to each other via an analog loop start telephony protocol. FIG. 4 provides a signal list corresponding to the steps of the method 81 shown in FIGS. 3A and 3B for the above-mentioned telephony protocol.

The PBX 42 receives a new call and associated intrinsic call arrival data from the PSTN 46 via one of the trunk lines 44 (step 83). The PSTN 46 provides associated call arrival data intrinsic to the network, such as automatic number identity (ANI), a caller line identity (CLID), and type of the calling telephone (II). In response to receiving the call, the PBX 42 may also generate call arrival data locally related to the automated call distribution system 40, e.g., dialed number identity (DNI) and dialed number information service (DNIS) (step 84). Next, the PBX 42 looks for an available one of the telephony lines 23 and transfers the call arrival data to the call server 22 via the available one of the lines 23 (step 85). The PBX 42 uses telephony signals 50 following the particular telephony standard supported by the PBX 42. Next, the call server 22 transmits a data message 52 with the call arrival data to the routing controller 20 over the data link 25, i.e., an ethernet link (step 86).

From the call arrival data 52, the routing controller 20 may formulate and send one or more directives 54 to the call server 22 over the data link 25 (step 87). The directive 54 commands the call server 22 to obtain new data from the caller interactively. The new data may include data on the caller's identity, the nature of the desired service, and/or processing data for the caller, e.g., payment method.

The directive 54 is optional and the routing controller 20 may decide to not send the directive 54 for some arrived calls (not shown in FIGS. 3A and 4). If the routing controller 20 does not send the directive 54 for a call, signals 56, 58, and 60 and steps 88–91 are not used to process that call.

In response to the directive 54, the call server 22 connects a caller prompting unit 48, e.g., a voice response unit, to the one of the telephony lines 23, which the PBX 42 has opened to the waiting call. The call server 22 has a separate caller prompting unit 48, because the internal voice response unit (not shown) of the PBX 42 is not generally controllable through the telephony lines 23. The call server 22 may operate the caller prompting unit 48 to play a welcoming message to the waiting caller (step 88). Then, the caller prompting unit 48 plays a menu 56 to the caller (step 89). The menu includes one or more questions based on the directive of the routing controller 20. The caller responds, for example, by using dial pad tones or by voice 58. After receiving the caller's responses, the call server 22 transmits a message 60 with call information including the caller responses to the routing controller 20 (step 90).

The directive 54 may also command the call server 22 to look up other call information using a local data base "DB". For example, this call information may be demographic information or information specific to the particular caller. The information specific to a particular caller may, for example, be used to confirm that the caller responded to questions from the caller prompting unit 48 with the correct maiden name of his or her mother.

In response to receiving the caller's responses 60 and/or other call information from the call server 22, the routing controller 20 determines whether to send additional directives to the call server 22, e.g., to direct more questions to the caller (step 91). If more call information is needed, the routing controller 20 returns to step 88. Otherwise, the routing controller uses the call information received from the call server 22, i.e., the call arrival data, the caller's responses to questions, and/or call data from the database DB, to determine how to process the call (step 92).

The routing controller 20 can direct a variety of actions to process the call. Examples of these actions include terminating the call, continuing to cue the call, taking a voice mail message from the caller, scheduling a call back, and/or playing an audio message to the caller. The routing controller 20 terminates the call if the caller requests an unavailable service, e.g., as determined by responses to questions from the caller prompting unit 48. The routing controller 20 continues to cue the call if a suitable agent exists, but is not in the ready state. The routing controller 20 may direct taking a voice mail message or scheduling a call back if the caller has a preferred agent who is presently unavailable. The routing controller 20 may direct playing an audio message to the caller to announce items of interest to the caller, e.g., specials. The audio message may be replaced by a facsimile or an electronic mail message in response to appropriate call types.

Processing the call may also include routing the call to either an automated unit for an auto response or to one of the agent stations 11–14 operated by a live agent. The routing controller 20 will route the call to a suitable agent as soon as such an agent becomes ready, i.e., agent readiness acts as an interrupt to continued call cueing. The routing controller 20 selects one of the agent stations 11–14 for call processing if the associated agent is in the ready state and is suitable to handle the call.

To select the agent, the routing controller 20 analyzes the associated call information for matches between agent stations 11–14 and the call. The matches are scored, and the routing controller 20 routes the call to the agent station 11–14 having the highest scoring match. If more than one agent station 11–14 has the same score for a particular call, the routing controller 20 routes the call to the agent station 11–14 that has been in the ready state for the longest time. If more than one call has the same score with the same agent station 11–14, the routing controller 20 routes the longest waiting call to the matching agent 11–14. Thus, in all cases, the routing controller 20 selects an agent matching the call at least as well as other ready agents.

The routing controller 20 receives messages 62, 64 with agent status data at irregular times, because agent stations change state at irregular times. The agent stations 11–14 send these status messages 62, 64 to the routing controller 20 directly via the data link 24 instead of indirectly through the PBX 42.

After determining how to process the call, the routing controller 20 sends a processing directive 66 to the call server 22, e.g., for transferring the call to a selected agent (step 93). In response to the transfer directive 66, the call server 22 undertakes telephony signaling 67 over the telephony lines 23 to inform the PBX 42 of the processing directive (step 94).

In the illustrated analog loop start protocol, the telephony signals 68 of step 94 entail a hand shaking sequence. The sequence includes a hook flash signal 68 from the call server 22 to the PBX 42 to indicate a new message, a tone from the PBX 42 to the call server 22 to acknowledge, and a series of DTMF tones, i.e., inband digits 71, from the call server 22 to the PBX 42 to indicate the content of the message. The series of DTMF tones indicate the type of processing, e.g., route or terminate the call. The series of DTMF tones may also indicate details of the processing, e.g., the identity of the selected agent station 11–14. The PBX 42 either reverses the loop current or transmits a tone to the call server 22 to indicate the start of routing of the call to the selected agent station 11–14 (step 96).

For PBX's using other telephony protocols (not shown) the exact sequence of telephony signals is different than the sequence of signals 68, 70, 71, and 74. For the digital BRI protocol, the call server 22 sends a transfer message to the PBX 42, and the PBX 42 sends a transfer acknowledgement to indicate the start of routing of the call. For the SIP protocol of IP telephony, the call server 22 sends a transfer message to the PBX 42, and the PBX 42 routes the call without sending an acknowledgement to the call server 22.

In response to detecting the loop current reversal or tone 74, the call server 22 sends a call transfer acknowledgement message 76 to the routing controller 20 over the link 25 (step 97). Upon receiving the call transfer acknowledgement 76, the routing controller 20 sends a call pending message 78 to the selected agent station 11–14 over the link 24 (step 98). The call pending message 78 may, for example, be a blinking icon on the video screen of the selected agent station 11–14. The call pending message 78 may also include associated caller data accumulated by the routing controller 20. After or simultaneous with receipt of the pending message 80, the PBX 42 applies a ring voltage 72 to the selected agent station 11–14 to ring his telephone (step 99).

When the telephone of the selected agent rings, the selected station 11–14 sends a call received message 80 to the routing controller 20 via the data link 24 indicate that the agent's telephone is ringing (step 100). Then, the selected agent can pick up the telephone and process the call. After finishing the processing, the agent station sends a message 82 to the routing controller 20 to indicate his agent status, e.g., wrap up, idle, or ready.

Referring again to FIG. 2, the call server 22 of some embodiments may store special executable software programs encoded on a storage device "D" therein. One of the special programs is a master program that controls the other special programs, the other special programs being slave programs. The master-slave structure of these special programs enables loading new slave programs on-the-fly, i.e., the master-slave structure forms a multi-threaded operating system. After loading, each new slave program is active to execute starting with the next call arrival. Thus, the structure of the special programs enables changing some characteristics of the call server 22 on-the-fly. The special software programs may execute either automatically or in response to the directives from the routing controller 20.

The slave programs can perform a variety of functions. Some slave programs enhance the ability of the call server 22 to communicate with the caller. For example, these slave programs may recognize speech responses or may send questions to the caller by facsimile. Other slave programs make the call server 22 send to different callers different messages. For example, a call server 22 of a public utility company may use a slave program which thanks a first customer to complain about a service problem, such as a power outage. The same slave program may then send a response to subsequent callers, such as "The company knows about and is handling the problem," i.e. without thanking the caller. Other slave programs may perform look ups of supplementary call data in the local databases "DB" of the call server 22. The slave programs enable call handling to change based on factors such as inferred call attributes, origination and identity of the call, and data looked up in the local data bases DB.

Figure 5:
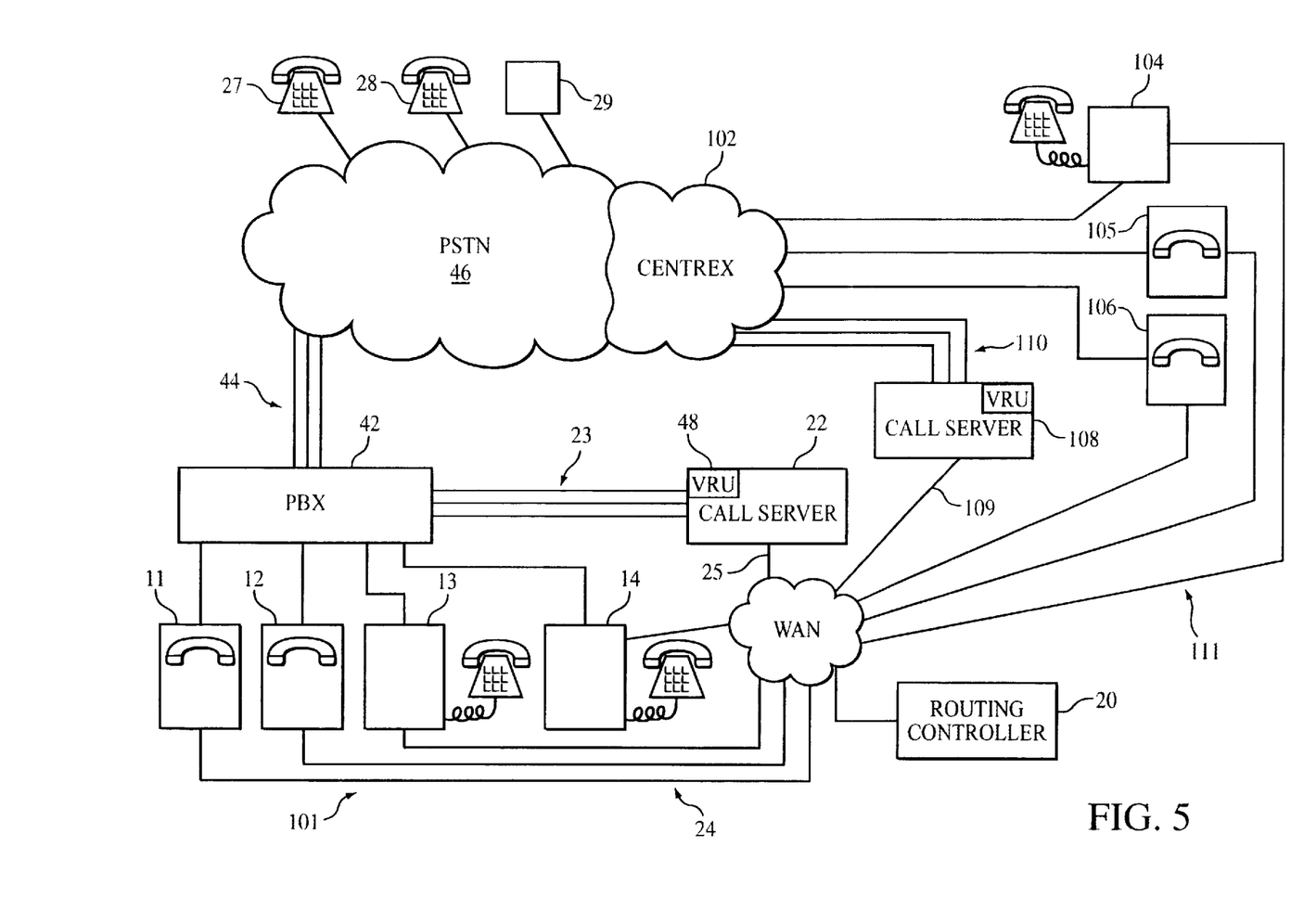
FIG. 5 illustrates an embodiment of an automated call distribution system employing a Centrex system.

FIG. 5 illustrates another specific embodiment 101 of the automated call distribution system 10 of FIG. 1. The call distribution system 101 uses both the PBX 42 and either a Centrex 102 to physically route calls. The Centrex 102 is a remote private network, i.e., leased from the PSTN 46. The Centrex 102 provides a controllable call routing capability similarly that of the PBX 42. The Centrex 102 and the PBX 42 may receive separate portions of the incoming calls from client devices 27–29. For example, each may receive calls from a subset of the telephone numbers assigned to the PBX. The Centrex 102 can route the calls to remote agent stations 104–106, e.g., for work-at-home agents or agents in a different office.

The Centrex 102 transmits call arrival data to and receives routing directives from a second call server 108 via one of telephony lines 110. The interaction between the Centrex 102 and the call server 108 is analogous to the interaction between the PBX 42 and the call server 22. The call server 108 may have a caller prompting unit, such as a voice request unit (VRU), to request and receive information from a caller via the Centrex 102.

The two call servers 22, 108 operate with different telephony protocols if the PBX 42 and the Centrex 102 use different protocols. Since interface cards for telephony protocols are less expensive than those for CTI protocols, some embodiments of the call server use one of a family of inexpensive off-the-shelf telephony-interface cards as a plug-ins to produce any desired telephony protocol. Changing the interface card inexpensively adapts such a call server to operate with any telephony interface. A minor adjustment at installation customizes the interface card to operate with a locally used telephony protocol.

Referring again to FIG. 5, the call servers 22, 108 couple through links 25, 109 and a wide area network (WAN) to the same routing controller 20. The interaction between the first and the second call servers 22, 108 and the routing controller 20 are analogous. The call router 20 uses the first and second call servers 22, 108 to obtain call data from and to send control signals to the PBX 42 and the Centrex 102, respectively.

The routing controller 20 also receives agent status data from both sets of agent stations 11–14, 104–106. The agent stations 11–14 and the agent stations 104–106 connect to the routing controller 20 through links 24, 111 and the WAN and communicate with the routing controller 20 analogously.

Figure 6A:
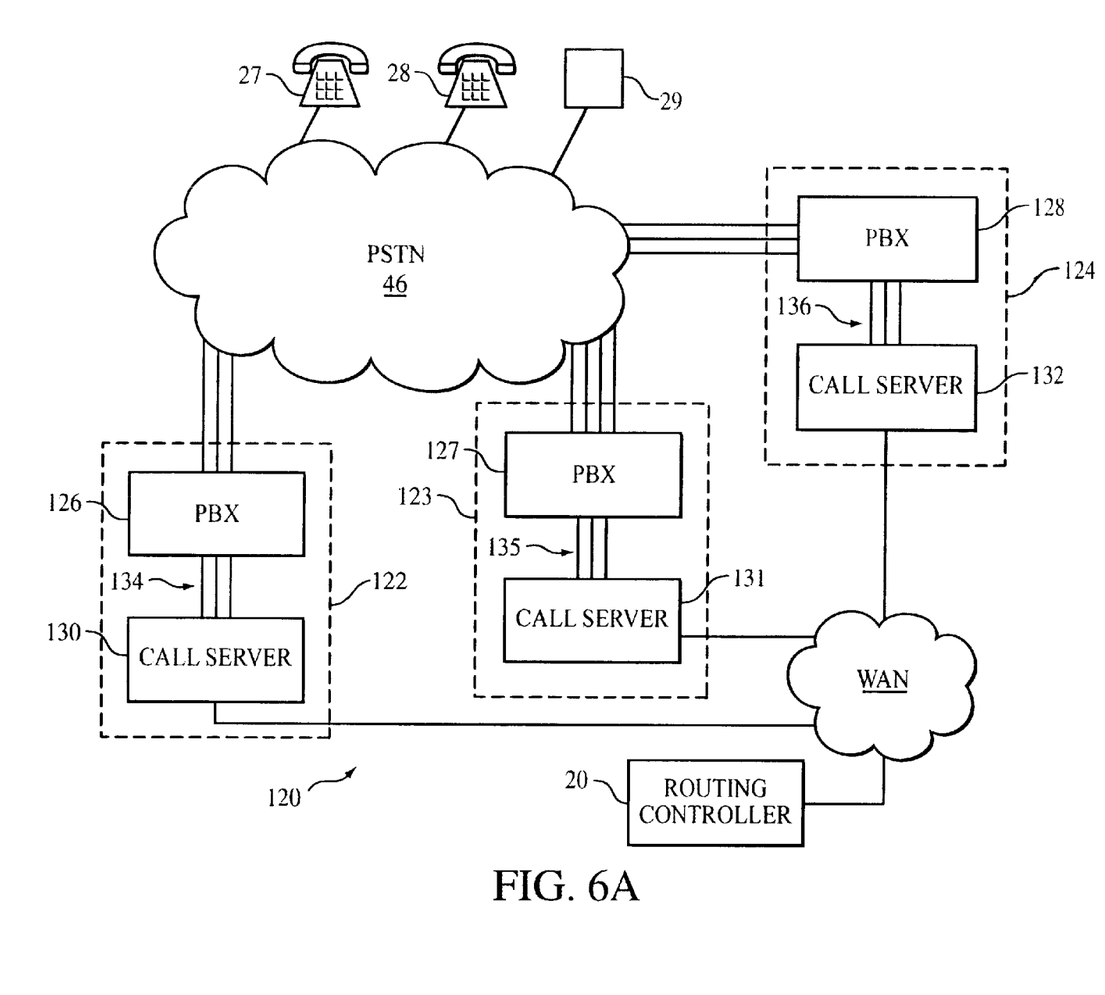
FIG. 6A illustrates an embodiment of an automated call distribution system with several PBX's.

FIG. 6A illustrates an automated call distribution system 120 with several remote call centers 122–124. Each remote center 126–128 has a PBX 126–128 and a local call server 130–132 coupled to the PBX 126–128 by a plurality of telephony lines 134–136. Each PBX couples to the PSTN by a number of trunk lines and serves to route calls to a number of agent stations (not shown) local to the same remote center 122–124. Each call server 130–132 and agent station also couples to the routing controller 20 by a WAN.

The routing controller 20 operates the local call servers 130–132 and corresponding local agent stations substantially as described with respect to FIGS. 2–4. But, the various PBX's 126–128 may be different models or be manufactured by different manufacturers. Thus, each PBX 126–128 may use a different telephony protocol to communicate with its local call server 130–132.

To deal with potentially different telephony protocols, each call server 130–132 has a card slot for a telephony interface card. The telephony interface card comes from a small universal family of cards, which is together capable of generating any telephony protocol. Each card of the family can mount in a card slot in the call servers 130–132 as a plug-in. Each call server 130–132 is configurable to handle the local telephony protocol of the associated PBX 126–128 with one of these cards after minor adjustments have been performed. The adjustments involve a changes such as configuring a few menu items of the card for the particular telephony protocol.

Since each call server 130–132 interacts with the WAN through the same data protocol, i.e., internet protocol, the same routing controller 20 can control all of the call servers 130. The single routing controller 20 can operate several local call centers 122–124 using different types of PBX's 126–128.

Figure 6B:
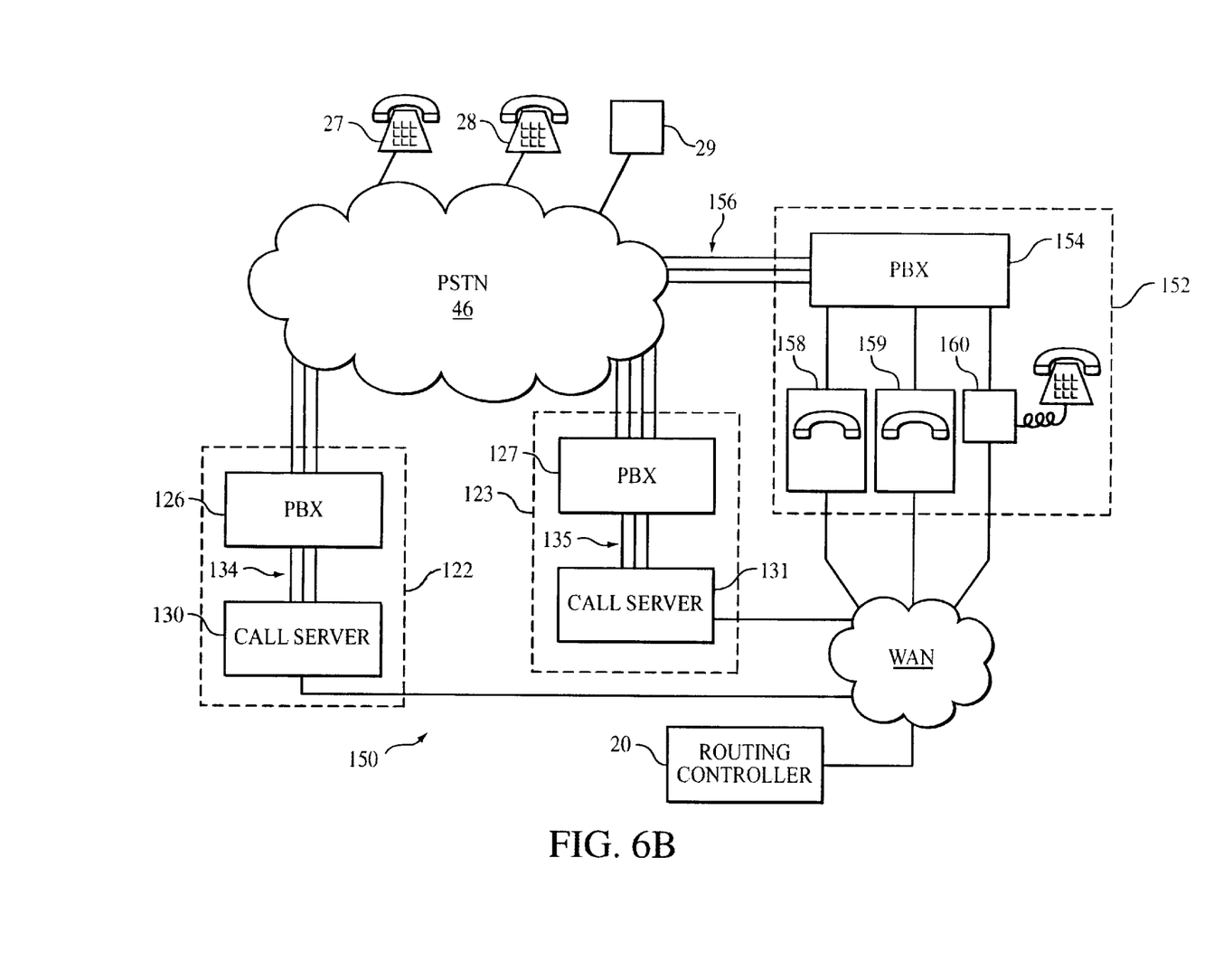
FIG. 6B illustrates another embodiment of an automated call distribution system with several PBX's.

FIG. 6B illustrates another automated call distribution system 150 with several remote call centers 122–123, 152. Each remote center 122–123, 152 has a PBX 126–127, 154. In the centers 122–123, the local call server 130–131 couples to the PBX 126–127 by the telephony lines 134–135 and are already described in relation to the system 120 shown in FIG. 6A. The PBX 154 of the new center 152 couples to the PSTN 46 by a number of trunk lines 156 and serves to route calls to agent stations 158–160 local to the same remote call center 152. The agent stations 158–160 also couple to the routing controller 20 by the WAN.

The routing controller 20 controls both the PBX's 127 and 154 through the single call server 131 substantially as described with respect to FIGS. 2–4. The call server 131 can pass directives from the routing controller 20 to the remote PBX 152 to route calls to agents selected from the relatively remote agents 158–160. The call server 131 transmits direct inward dial (DID) numbers through the PSTN 46 to pass these directives to the relatively remote PBX 152.

Figure 7:
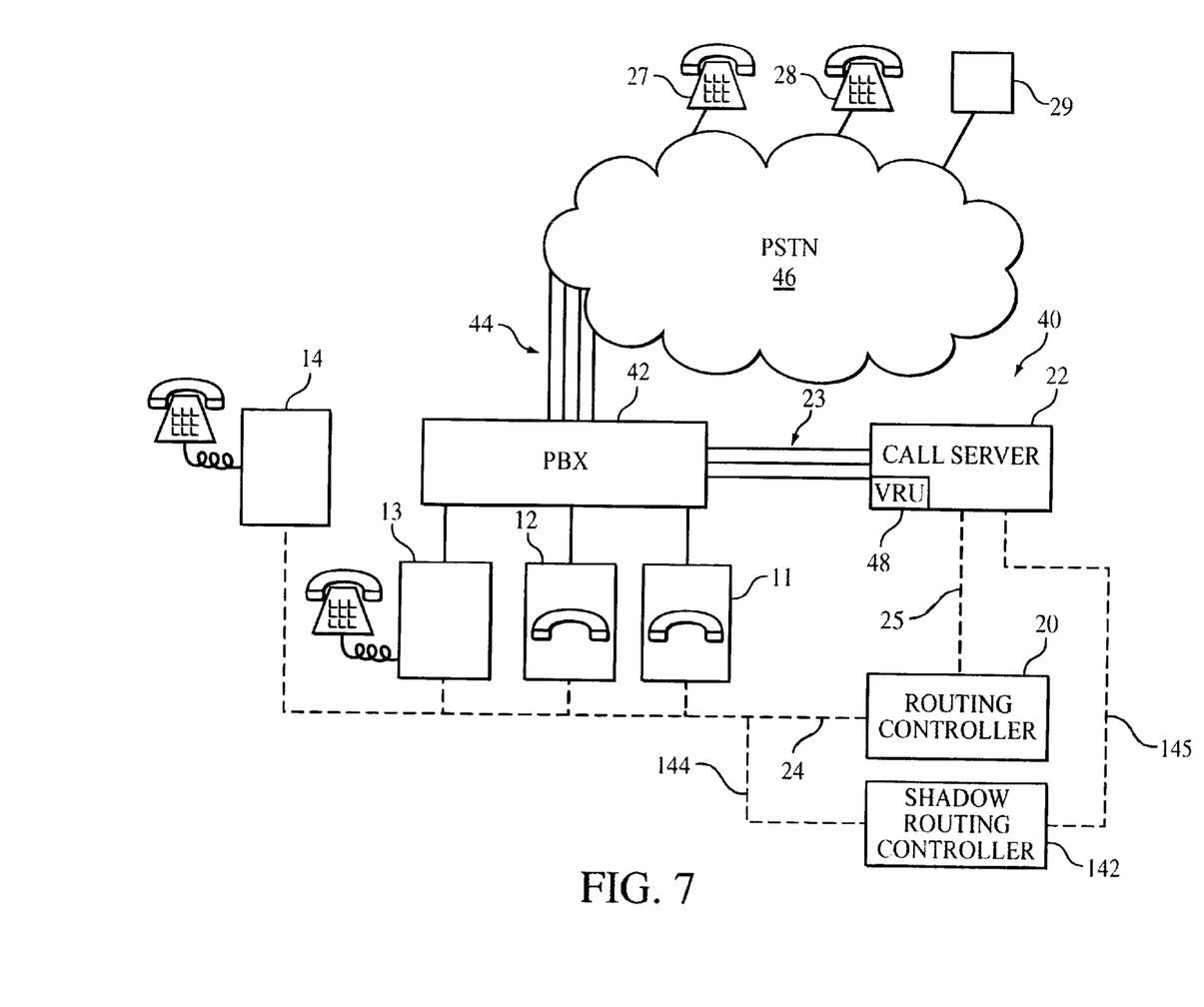
FIG. 7 illustrates an embodiment of an automated call distribution system with a fault recovery system.

FIG. 7 illustrates a specific embodiment 140 of the automated call distribution system 40 shown in FIG. 2 with a fault recovery capability. The center 140 includes a shadow routing controller 142, which couples both to the agent stations 11–14 and to the call server 22 via data links 144, 145. The agent stations 11–14 send agent status data to both the normal and the shadow routing controllers 20, 142. The call server 22 mirrors processing directives, e.g., routing directives, and call arrival data from the call server 22 to data link 145.

The data accumulated during normal operation enables the shadow routing controller 142 to restart call processing if the normal routing controller 20 fails. Nevertheless, in normal operation, the shadow routing controller 142 receives minimal data. For example, the shadow routing controller 142 does not receive call information obtained by the caller prompting unit 48 during normal operation. By limiting the amount of data received, the automated call distribution system 140 operates with substantially the same speed as the automated call distribution system 40 of FIG. 2 during normal operation.

An absence of handshaking responses from the routing controller 20 alerts the call server 22 that the normal routing controller 20 has failed. In response to such a failure, the call server 22 informs the shadow routing controller 142 of its availability to respond to directives from the shadow routing controller 142. The call server 22 also transmits the call information that it possesses to the shadow routing controller 142 in response to the failure. In response, the shadow routing controller 142 restarts or "rehomes" the call processing by directing the call server 22 to obtain call information from the last caller. From that point onward, the shadow routing controller 142 processes the call like the normal routing controller 20 and receives full data from the call server 22.

An absence of handshaking responses from the normal routing controller 20 also alerts the agent stations 11–14 of the failure of the normal routing controller 20. In response to such a failure, each agent station 11–14 starts to inform the shadow routing controller 142 of its agent status and responds to directives from the shadow routing controller 142.

A system operator may also manually switch over from the normal routing controller 20 to the shadow routing controller 142. Such a switch over enables the operator to perform maintenance work on the normal routing controller 20 with a minimal interruption of the activity of the automated call distribution system 140.

Other additions, subtraction, and modifications of the described embodiments may be apparent to one of ordinary skill in the art. E.g., multiple routing controllers could be operating at the same time to route calls to associated agents; if one of the routing controllers fails, its agents, call server(s) and incoming calls could be handled by another router.

What is claimed is:

1. An automated call distribution system for calls over a communications network including a PSTN having a Centrex having a specific telephony protocol providing both call arrival data and a controllable routing capability, comprising:

a plurality of agent stations, each station having a processor and a communication element connected to receive calls routed thereto via said Centrex, a call server that is connected to said Centrex via an interface card for said specific telephony protocol and to use telephony lines to receive the call arrival data from said Centrex and to direct the routing capability of said Centrex, said call server being adapted to receive one of a plurality of different interface cards, each card being configured to handle a respective type of Centrex, the call server having a caller prompting unit to request and receive information from a caller, the call server to generate call information in response to the information from the caller and/or the call arrival data, said call information being independent of said specific telephony protocol; and a routing controller to receive data for agent status from the agent stations, to receive the call information from the call server, to select an agent station based upon the call information and the data for agent status, and to cause the call server to direct the routing capability to route the call to the selected agent station, said routing controller being independent of said specific telephony protocol.

2. The system of claim 1, wherein the routing controller is configured to route both incoming and outgoing calls with respect to the automated call distribution system.

3. The automatic call distribution system of claim 1, wherein the communication element includes a telephone.

4. The automatic call distribution system of claim 1, further comprising:
first and second data links connecting the routing controller to the call server and the agent stations, respectively, the second data links adapted to transmit data for agent status to the routing controller.

5. The automatic call distribution system of claim 1, wherein each agent station connects to the network with one of an ISDN interface, an internet interface, a wireless interface, a POTS interface, and a digital PBX interface.

6. The automatic call distribution system of claim 1, wherein the agent stations are configured to receive calls selected from the group consisting of telephone calls, electronic mail, data collaboration sessions, audio-video calls, and facsimiles.

7. The automatic call distribution system of claim 1, wherein at least one on the agent stations is a fully automated machine capable of providing an interactive session with a caller.

8. The automated call distribution system of claim 1, wherein the call server and routing controller are configured to route incoming calls from the network.

9. The automatic call distribution system of claim 8, wherein the call arrival data comprises one or more of ANI, CLID, DNI, DNIS, and II.

10. An automatic call distribution system for calls over a telephone network providing call arrival data, comprising:
a PBX connected to the network to receive calls and call arrival data, said PBX having a first specific telephony protocol;
a plurality of agent stations, each station having a processor and a communication element connected to receive calls routed thereto by the PBX;
a call server that is adapted to use telephony lines to receive the call arrival data from and to control call routing by the PBX via an interface card for said first specific telephony protocol, said call server being adapted to receive one of a plurality of different interface cards, each card being configured to handle a respective type of PBX, the call server having a caller prompting unit to request and receive information from a caller, the call server to generate call information in response to the information from the caller and/or the call arrival data, said call information being independent of said first specific telephony protocol; and
a routing controller connected to the agent stations to receive agent status data and connected to the call server to receive the call information, the controller to select an agent based upon the call information and the agent status data, and to cause the call server to control the PBX to route the call to the selected agent station, said routing controller being independent of said first specific telephony protocol.

11. The automatic call distribution system of claim 10, wherein the PBX is configured to connect to a network selected from the group consisting of a PSTN, a wireless network, an internet network, and a POTS.

12. The automatic call distribution system of claim 11, further comprising:
a data network, the routing controller to receive agent status data from the agent stations via the data network.

13. The automatic call distribution system of claim 10, further comprising:
a second PBX connected to receive a second call and associated second call arrival data from the network, said second PBX having a second specific protocol that is different than said first specific telephony protocol;
a plurality of second agent stations, each second station having a processor and a communication element connected to receive second calls routed thereto by the second PBX; and
a second call server connected to the second PBX via one or more telephony lines to receive the call arrival data from and control call routing by the second PBX via an interface card for said second specific telephony protocol, the second call server having a voice response unit to request and receive information from an associated second caller, the second call server to generate second call information in response to the information from the second caller and/or the second call arrival data, said call information being independent of said second specific telephony protocol; and
wherein the routing controller is connected to receive second agent status data and the second call information and is adapted to select one of the second agents based upon the second call information and second agent status data, and to cause the second call server to control the second PBX to route the second call to the selected second agent station, said routing controller being independent of said second specific telephony protocol.

14. The automatic call distribution system of claim 13, further comprising:
a second routing controller connected to receive the agent status data and call arrival data from the agent stations and the call server, respectively, and to operationally replace the first routing controller in response to a failure in the first routing controller.

15. The automatic call distribution system of claim 13, wherein at least one of the call servers includes a program storage device encoding an executable program to perform one of voice recognition and transmitting facsimiles.

16. The automatic call distribution system of claim 13, wherein one of the call servers includes a program storage device encoding an executable program for handling different callers differently, slave components of the program being loadable on-the-fly.

17. The automatic call distribution system of claim 10, wherein the network includes a PSTN having a Centrex having a second specific protocol that is different than said first specific telephony protocol, and further comprising:
a plurality of second agent stations with processors and communication elements connected to receive second calls routed by the Centrex; and
a second call server to receive the second call arrival data from and control second call routing by the Centrex via one or more telephony lines via an interface card for said second specific telephony protocol, the second call server having a caller prompting unit to request and receive information from an associated second caller, the second call server to generate second call information in response to the information from the second caller and/or the second call arrival data, said call information being independent of said second specific telephony protocol; and
wherein the routing controller is connected to receive second agent status data from the second agent stations and to receive the second call information, the controller to select one of the second agent stations from the second call information and second agent status data and to cause the second call server to operate the Centrex to route the second call to the selected second agent station, said routing controller being independent of said second specific telephony protocol.

18. The automated call distribution system of claim 10, wherein the routing controller is configured to cause the call server to place a portion of the calls to customer devices connected to the network.

19. The automatic call distribution system of claim 10, wherein a portion of the communication elements include a telephone.

20. The automatic call distribution system of claim 13, further comprising:

first and second data links connecting the routing controller to the call server and the agent stations, respectively, the second data links adapted to transmit agent status data to the routing controller.

21. The automatic call distribution system of claim 10, wherein each agent station connects to the network with one of an ISDN interface, an internet interface, and a wireless interface.

22. The automatic call distribution system of claim 10, wherein at least one on the agent stations is a fully automated machine capable of interacting with a caller.

23. The automated call distribution system of claim 10, wherein the call server and routing controller are configured to route incoming calls from the network.

24. The automatic call distribution system of claim 23, wherein the call arrival data comprises one of ANI, CLID, DNI, and DNIS.

25. The automatic call distribution system of claim 10, further comprising:

a second PBX connected to receive second calls and associated second call arrival data from the network;

a plurality of second agent stations, each second station having a processor and a communication element connected to receive second calls routed thereto by the second PBX; and wherein the call server is adapted to control the second PBX via one or more telephony lines that receive the second call arrival data from and control second call routing by the second PBX.

* * * * *